No. 663,054. Patented Dec. 4, 1900.
A. WEGMANN-HAUSER.
ACETYLENE GAS GENERATOR.
(Application filed May 10, 1899.)

(No Model.)

Witnesses:

Inventor:
Arnold Wegmann-Hauser

UNITED STATES PATENT OFFICE.

ARNOLD WEGMANN-HAUSER, OF ZURICH, SWITZERLAND.

ACETYLENE-GAS GENERATOR.

SPECIFICATION forming part of Letters Patent No. 663,054, dated December 4, 1900.

Application filed May 10, 1899. Serial No. 716,280. (No model.)

*To all whom it may concern:*

Be it known that I, ARNOLD WEGMANN-HAUSER, a citizen of the Republic of Switzerland, residing at Zurich, in the Republic of Switzerland, have invented certain new and useful Improvements in Acetylene-Gas Generators, (for which I have applied for a patent in the following countries: Switzerland, filed October 15, 1898, No. 19,519; Germany, filed October 20, 1898, No. W. 14,529; France, filed January 21, 1899, No. 273,072; Austria, filed January 23, 1899; Hungary, filed January 23, 1899, No. 1,045, and Sweden, filed April 12, 1899, No. 642,) of which the following is a specification.

This invention relates to the production of acetylene gas.

As is well known, when a carbid is placed in contact with or is immersed in water it soon becomes coated with hydrate of lime, and although the hydrate of lime as it forms on the surface of the pieces of carbid adheres thereto but slightly and is readily removed, yet if not removed it finally forms a compact coating which is practically impermeable by water, so that the action of the water upon the carbid and the decomposition of the latter is greatly interfered with and finally completely arrested.

This invention has for its object means for effectually preventing the formation of a coating of hydrate of lime on the surfaces of the pieces or lumps of carbid by establishing during gas production a constant circulation of the water through the body or layer of carbid of sufficient rapidity or vigor to wash off the hydrate of lime as rapidly as it is formed and to induce this circulation through the agency of the gas evolved.

If a gas is generated or produced within a body of water, a large portion of the latter is displaced by the gas as it rises through said body of water, thus forming a column of fluids which is very much lighter than the surrounding column of water, and in order to establish a circulation of the water it is simply necessary to separate the lighter column of fluids from the heavier and provide means whereby said heavier column of water may follow the upward direction of the lighter column of fluids through the layer of carbid.

That my invention may be fully understood I will proceed to describe the same in detail, reference being had to the accompanying drawings, in which—

Figure 1:
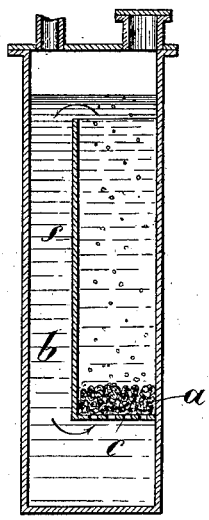
Figure 2:
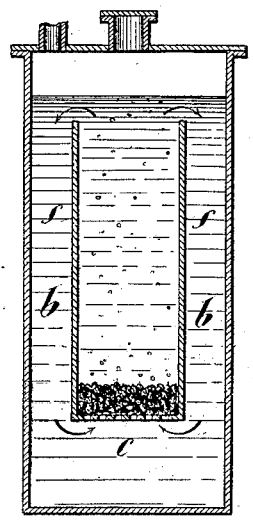
Figure 3:
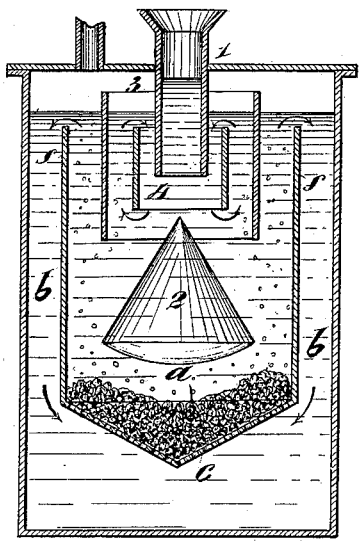
Figure 4:
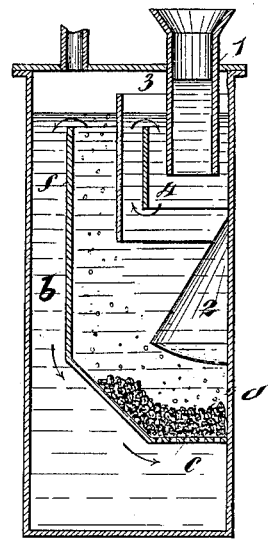

Figure 1 is a vertical section of one form of apparatus constructed in accordance with my invention, and Figs. 2, 3, and 4 are similar views illustrating structural modifications.

The essential features of an apparatus designed for the carrying out of my invention consist of a vessel in which is arranged a gas-producing chamber open at its upper end and provided at its lower end with an open-work support, as a grate or perforated or reticulated bottom, said chamber being so arranged within the vessel that its opposite ends will be sufficiently distant from the corresponding heads of the vessel to admit of a free circulation of the water in a downward direction along the chamber and in an upward direction through said chamber, such circulation being induced by the evolution of the gas in the chamber, as above set forth.

In Figs. 1 and 2 I have shown the apparatus in its simplest form, the producer consisting of an outer vessel $a$, in which is arranged the producing-chamber $b$ along the inner wall of said vessel, said chamber being open at top and having at its lower end a perforated support $c$ for the carbid. The vessel has in its upper head a carbid-feed pipe 1 in line with the producing-chamber $b$ and a gas-discharge pipe $p$, said feed-pipe 1 being, of course, normally closed by any suitable means. (Not shown.)

It will readily be seen that when the chamber $b$ is supplied with carbid and the vessel $a$ filled with water, so as to seal the upper open end of said chamber, the gas evolved from the carbid and rising through the column of water in the chamber will displace a large portion thereof, the specific gravity of the column of fluid in chamber $b$ being thereby greatly reduced, thus inducing the heavier body of water around the chamber to flow in a downward direction and in accordance with the law of motion of fluids follow the upflow of the column of fluids in said chamber $b$ through the perforated bottom thereof and through the layer of carbid thereon. This circulation of the water in the producer is sufficiently vigorous or powerful to wash away the hydrate of lime as it is formed on the surface of the carbid, such hydrate being carried along by the current out of the producing-chamber into the more quiescent body of water in the vessel $a$, wherein it subsides.

Instead of arranging the producing-chamber $b$ along the walls of the vessel $a$ it may be arranged axially, as shown in Fig. 2, the location of the carbid-feed pipe 1 being correspondingly changed.

In the construction shown in Figs. 1 and 2 and as above described the carbid-feed pipe is normally closed, and the opening and reclosing of said pipe require considerable attention and care, while a loss of gas is unavoidable when said pipe is opened for supplying carbid to the producing-chamber. In Figs. 3 and 4 I have shown a construction of apparatus whereby these inconveniences are avoided. The producing-chamber $b$ may here also be arranged either along the walls of the vessel $a$, Fig. 4, or concentrically with said vessel, Fig. 3, the grated bottom $c'$ of said chamber having inclined sides to direct the carbid to the lowest point of said bottom. Within the chamber $b$ is arranged a conical deflector 2, the apex of which cone projects into a concentrically-arranged open-ended chamber 3, forming a passage into which the feed-pipe 1 projects to a sufficient extent to be sealed by the water, said chamber or passage 3 having its upper end above the normal water-level in the producer, or, in other words, the upper end of said chamber 3 opens into the gas-space 5 of the producer. The convex base of the cone is of substantially the same diameter as that of the passage 3, so that as the gas evolved at the lower end of the producing-chamber $b$ rises it is deflected by the convex base of the cone 2 toward the walls of said producing-chamber, so that but a very small amount of gas will rise through the chamber 3, while no gas can rise through the feed-pipe 1, the height of the column of water in said feed-pipe varying with the pressure in the gas-space 5 of the producer, so that an open-ended carbid-feed pipe can be used. In order, however, to guard against any possible waste of gas through the feed-pipe, which may occur during a very copious or violent evolution of gas, such as may take place during the feeding of carbid to the producing-chamber, I arrange concentrically within the chamber a second shorter open-ended chamber 4, so as to be completely immersed in the water, yet with its upper end quite close to the normal water-level, thus forming a second passage around the inner end of the feed-pipe 1, whereby a subsidiary circulation is established in an upward direction through the chamber or passage 4 around the feed-pipe 1 and in a downward direction through the chamber 3, and as the gas will flow in the direction of least resistance no gas will rise through the feed-pipe 1.

Having thus described my invention, what I claim as new therein, and desire to secure by Letters Patent, is—

1. An acetylene-gas producer, comprising a vessel, a producing-chamber supported therein with its upper open end and its lower grated end at a suitable distance from the opposite heads of said vessel, an open-ended chamber of less cross-sectional area than the producing-chamber, supported in the open end thereof so as to project a suitable distance into the same, a carbid-feed pipe having its outlet within the open-ended chamber, and means for deflecting the gas evolved at the grated end of the producing-chamber toward the walls thereof, substantially as and for the purposes set forth.

2. An acetylene-gas producer, comprising a vessel, a producing-chamber supported therein with its upper open end and its lower grated end at a suitable distance from the opposite heads of said vessel, an open-ended feed-chamber of less cross-sectional area than the producing-chamber, supported in the open end thereof so as to project a suitable distance into the same, a carbid-feed pipe having its outlet within the open-ended chamber, and a deflecting-cone whose base is of substantially the same diameter as that of said open-ended chamber, said cone supported in the producing-chamber between its grated end and the open-ended chamber, substantially as and for the purpose set forth.

3. The combination with the vessel $a$, the producing-chamber $b$, the open-ended chambers 3 and 4 and the deflector 2 arranged in said vessel and relatively to one another for operation as described, and the carbid-feed pipe 1 extending into chamber 4, substantially as and for the purpose set forth.

In witness whereof I have hereunto set my hand in presence of two witnesses.

ARNOLD WEGMANN-HAUSER.

Witnesses:
MORITZ VEITH,
A. LIEBERKNECHT.